E. P. NOYES.
MIXER FOR GASES AND LIQUIDS.
APPLICATION FILED JAN. 8, 1907.
979,787.
Patented Dec. 27, 1910.
2 SHEETS—SHEET 1.
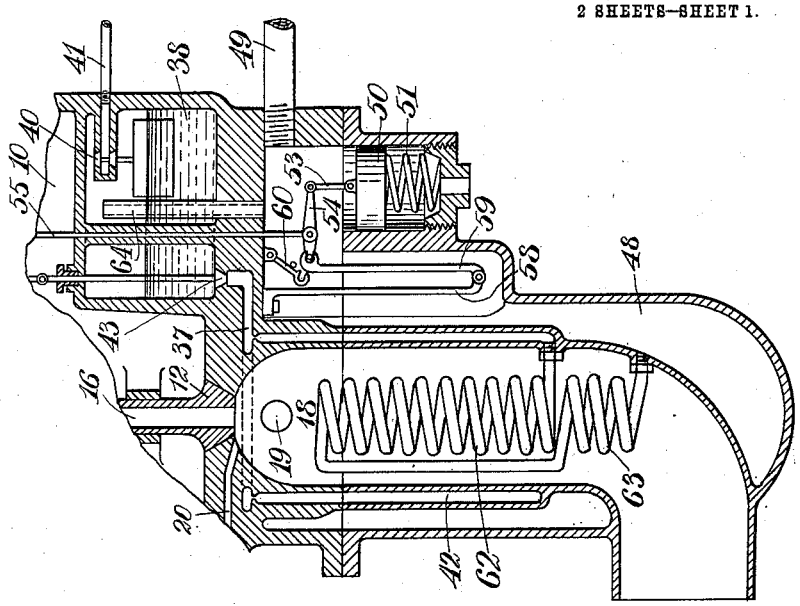
Witnesses:
G. W. Hopkins
J. Blake
Inventor:
E. P. Noyes
by Robert M. Pierson
atty

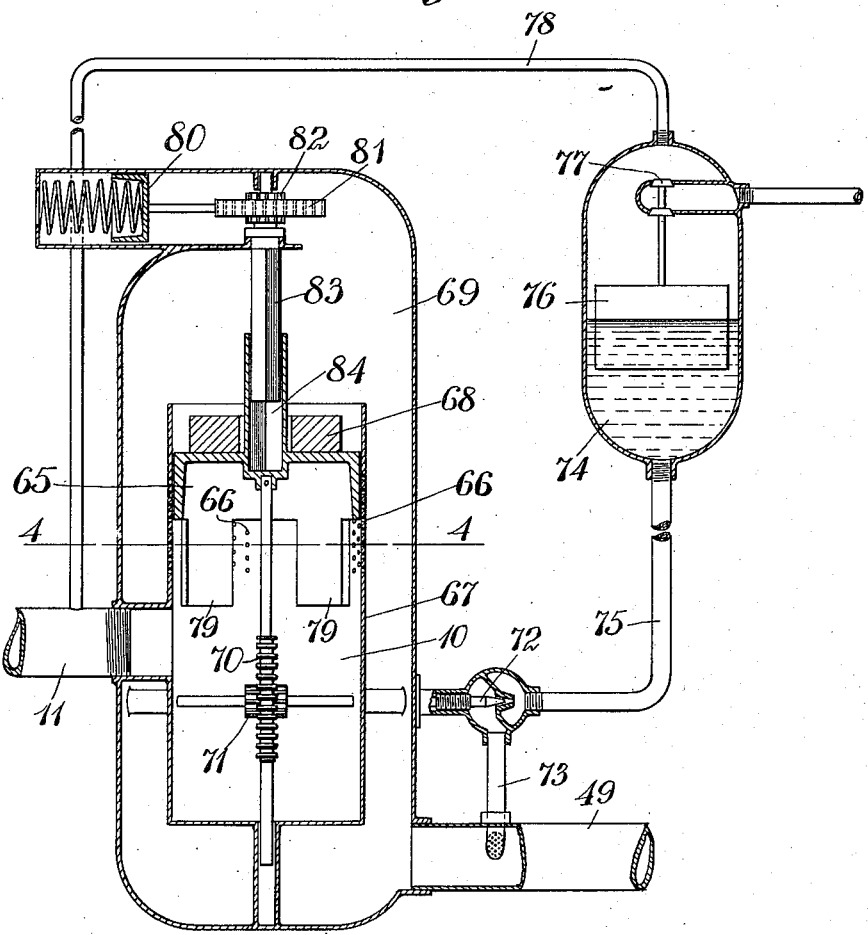

UNITED STATES PATENT OFFICE.

EDWARD P. NOYES, OF WINCHESTER, MASSACHUSETTS, ASSIGNOR, BY MESNE ASSIGNMENTS, TO C. P. POWER COMPANY, OF NEWARK, NEW JERSEY, A CORPORATION OF NEW JERSEY.

MIXER FOR GASES AND LIQUIDS.

979,787.   Specification of Letters Patent.   Patented Dec. 27, 1910.

Application filed January 8, 1907. Serial No. 351,317.

*To all whom it may concern:*

Be it known that I, EDWARD P. NOYES, a citizen of the United States, residing at Winchester, in the county of Middlesex and State of Massachusetts, have invented certain new and useful Improvements in Mixers for Gases and Liquids, of which the following is a specification.

This invention relates to apparatus for measuring and proportioning a current of gaseous or aeriform fluid and one or more liquid currents, for the purpose of causing them to flow in a predetermined volumetric ratio and also if desired in a predetermined quantity-ratio. Its uses are found principally in the mixing of a gas and a liquid (although it may proportionately regulate the flow of gases and liquids which do not become mixed), and in this field its principal applications are to carbureters for explosive and other internal-combustion engines, constant-flame burners for Joule-cycle internal-combustion apparatus, coolers for mixing water with hot combustion-gases under pressure, and hydrocarbon-heated steam-boilers. As a carbureter the apparatus will mix air and liquid-fuel in combustible proportions. As a generator for constant-flame internal-combustion burners it will perform an analogous carbureting or fuel-proportioning function and in addition will mix water with the burner gases in proportion to the quantity of fuel burned and thus reduce the temperature in a stable degree. As a simple water-and-hot-gas mixer it will perform this latter function for hot gases received from any source such as the high-pressure exhaust of a compound explosive engine. As a burner for steam-boilers it will properly proportion the air and liquid fuel and may also proportion the boiler-water in the proper ratio to the quantity of fuel burned.

My invention depends upon the principle of a meter for the gaseous fluid responsive to the variations in volume of said fluid and connected with one or more liquid-controlling valves for varying the orifice for liquid-flow conformably with the variation in volume of gas-flow so that the ratio may remain the same throughout a wide variation in the actual volumes flowing. The apparatus is or may be also made responsive to changes in pressure of the gas. Since gaseous fluids are compressible and liquids substantially incompressible, a variation in density of the gas, giving a changed quantity of gas for any given volume-flow thereof, calls for a change in the opening of the liquid-valve for any given gas volume-flow, and this change I effect by introducing a pressure-responsive device to change the ratio of movement of the liquid-valve. The term "gas" is here used generically to indicate any aeriform fluid. Specifically in a carbureter or similar device the gaseous fluid handled would be air. I further make novel use of a thermostat as a useful though not indispensable auxiliary in certain instances.

Of the accompanying drawings, Figure 1 shows a vertical section of a constant-flame pressure-generator embodying my invention and including the control of two liquids, one being fuel for the burner and the other water for converting the heat of the burner gases. Fig. 2 represents a detail section showing the invention modified to apply it to external-combustion burners for steam-boilers. Fig. 3 represents a sectional view showing another modification including a different form of gas-metering device and a single liquid-controlling valve. Fig. 4 represents a section on the line 4—4 of Fig. 3.

Referring to the construction shown in Fig. 1, 10 is an anterior-pressure air-chamber having an air inlet 11. The air enters the chamber 10 by the inlet 11 and flows out of said chamber past a resistance-valve 12 connected by a stem 13 with a flexible septum or diaphragm 14 surmounted by a downwardly-acting adjustable spring 15 whose tension will remain substantially fixed throughout a considerable range of movement of the diaphragm. This diaphragm is made relatively large in diameter so as to give ample power, while the valve 12 and its passage are relatively small to give good velocity and mixing effects. The pressure on the posterior side of the valve 12 is carried back through a duct 16 in the valve-stem to a chamber 17 on the upper side of the diaphragm and hence the posterior pressure and the spring 15 acting together tend to close valve 12 upon its seat. The consequence is that a drop in pressure is imposed upon the air passing from chamber 10 to chamber 18, which drop or pressure-difference remains substantially constant so long as the tension of spring 15 is unvaried and this pressure-drop is independent of the actual volumes of air flowing past the valve. The valve opens more or less to accommodate the varying volumes flowing at any instant and the device therefore constitutes an air-meter, the vertical position of whose valve indicates the volume or number of cubic feet of air flowing per unit of time. By suitable shaping of the valve 12 and its seat the device may be made to work so that uniform increments of volume of air flowing will cause uniform increments of rise in valve 12, although such action is not essential and the valve may have various forms. The air flows into a posterior-pressure chamber 18 which in this instance is a combustion-chamber operating under a superatmospheric pressure produced by feeding compressed air to the chamber 10 through pipe 11, and having an igniter 19 for starting the flame. The device then acts as a superatmospheric-pressure carbureter whose mixing-chamber 18 is also a combustion-chamber for burning the fuel according to what is known as the "constant-pressure cycle" to distinguish it from the explosive or constant-volume cycle.

20 is a liquid-fuel duct opening below air-valve 12 and forming the outlet of a fuel-reservoir 21 which is provided with a float 22 controlling a fuel-supply valve 23 for maintaining a constant level of liquid in the reservoir. The liquid fuel is pumped in through a pipe 24 under a pressure superior to the air-pressure in chamber 10. The lower orifice of duct 20 constituting the fuel inlet to chamber 18, is posterior to the air-inlet past valve 12 in the sense of being substantially impinged by the air-flow past said valve. This is also true of the water-inlet 36 hereinafter described.

At the entrance of duct 20 is placed a fuel-valve 25 connected by a link 26 with the short arm of a second-class lever 27. This lever has a fixed fulcrum at 28 and its long arm is connected with the air-valve stem 13 so that any given travel or position of the air-valve 12 results in a corresponding position or travel of the fuel-valve 25. By proper shaping of the valves and seats the air and fuel orifices may be caused to remain in the same ratio throughout the range of the two valves for any given position of the pin 29 on lever 27. The head or height of the liquid column remains substantially constant by the action of the float-valve 23, and the pressure-difference on opposite ends of the liquid column remains substantially constant by the action of the resistance-valve 12. By maintaining this pressure-difference constant, the liquid column is rendered free of any variations in liquid-feeding pressure of the air. Hence all liquid-flow-varying influences, with the exception of the orifice-variation effected by valve 25, are eliminated and the result is that the volumes of liquid-flow are in strict accordance with the volumes of air-flow, thus maintaining the air and fuel in desired proportions for the maintenance of combustion. A constant ratio of volume-flow for the air and fuel, though generally desirable, is not essential, and I may cause a given range of air-volumes to measure a disproportionate range of fuel volumes. For example, an increased ratio of fuel is sometimes desired in carbureters when the volumes of flow are smallest. These matters are within the choice of the designer, because, as my apparatus provides for equality of pressure-difference on opposite sides of the air and fuel orifices and also provides for varying the size of the orifices in a constant or other known relation, the two principal factors entering into the law which governs fluid-flow through orifices of moderate length, namely the difference in pressure on the two sides of the orifice, and the area of the orifice, are placed under control, and by maintaining one factor, that is, the pressure-difference, constant for both orifices, the desired results may be attained by varying the other factor, namely the area, for both orifices in an equal or known degree. The fuel flowing from the lower orifice of duct 20 mixes with the air flowing past the air-valve 12 and is broken up by the substantial velocity of the air at this point. The difference of pressure above and below the air-valve being constant, the mixing effect of the air blast will remain constant for various volumes of the two fluids.

It will be understood that I have not attempted to show the most advantageous relation of the orifices for discharge of air and fuel into mixing-chamber 18 in order to secure maximum pulverization of the fuel, but in this as well as in other respects have made the drawing somewhat diagrammatic for the sake of clearness. I have also omitted to show adjustments which a mechanic would naturally provide for certain of the valves or other parts to take up wear or vary their relative positions. It should be further stated that while the diaphragm 14, together with the spring and air-valve, constitute a volume-meter whose action involves the maintenance of a substantially consant pressure-drop, this device like many others designed to maintain constant conditions, depends for its action on slight fluctuations in those conditions themselves. Thus the air-valve 12 does not open to a wider position until a larger on-coming volume of air has established a slightly increased pressure-difference between chambers 10 and 17, which will raise the diaphragm 14 and by establishing a larger opening at the valve 12 to accommodate the enlarged air-volume, will restore the standard pressure-drop, which had temporarily fluctuated.

Under some conditions I may omit the float-valve device, such as 22, 23, and use other means for maintaining a constant head, or may even feed the liquid under a variable head if its effective pressure is not allowed to vary widely or is controlled in a suitable manner, the air and liquid metering devices in such a case being allowed to operate on substantially the same principle as explained above.

If large variations in the density of the air current through 10, 18, etc., take place, the device requires correction for pressure, and this I effect automatically by means of a pressure-responsive piston 30 having on one side the anterior compressed air-pressure in chamber 10 and on the opposite side a substantially constant pressure supplied by a spring 31 and the atmosphere. This piston connects with the link 26 by rod 32, a lever 33, and a rod 34, and the effect of its movement is to slide the pin 29 along a guide 35 on lever 27 toward and from the fulcrum of said lever. Hence the fuel-valve 25 has a greater or less amplitude of movement in relation to the air-valve 12 according as the air-pressure in chamber 10 rises or falls. With an increase of air-pressure the density increases and a larger quantity or mass of air is contained in any given volume, but since the fuel is substantially incompressible, a position of the air-valve measuring this increased quantity but unchanged volume of air would measure the same actual quantity of fuel as before and hence would tend to disturb the desired ratio of air and fuel quantities. The piston 30 corrects this tendency and moves the pin 29 away from the fulcrum 28 to give the valve 25 a larger proportionate throw when the air-pressure increases.

In the internal-combustion generator here shown the hot gases of combustion require quenching with water before they pass to the engine, and for this purpose I show a water-feed regulator essentially similar to the fuel-feed regulator above described.

36 is a water-spray nozzle in the lower part of the combustion-chamber supplied from a duct 37 forming the outlet of a water-reservoir 38 which has a constant-level float 39 and valve 40, and a supply-pipe 41 leading from a water-pump. At 42 the water-duct is expanded into a jacket for cooling the walls of the combustion-chamber 18. At the entrance of the duct is placed a valve 43 operated from the air-valve stem 13 by a link 44, pin 45 and lever 46 fulcrumed at 47, these parts being similar in construction and action to the described mechanism for fuel-control and serving to effect a flow of water into the combustion-chamber, proportionate in volume to the volumes of air and fuel supplied to the burner. Hence for any given amount of heat generated in the burner a proportionate amount of water is supplied for quenching the hot products of combustion and reducing their temperature to a stable point, the mixture of burned gases and steam being conducted from the lower mouth of the combustion-chamber 18 upwardly around said chamber through a passage 48, and from thence out through a pipe 49 to the engine. For the correction of pressure variations as related to this part of the apparatus I show a second piston 50 with posterior gaseous pressure on its upper side opposed to a spring 51 and atmosphere on its lower side, said piston having the effect of throwing the pin 45 toward and from the fulcrum of lever 46 along a guide 52 on said lever, and thus varying the ratio of movement of the water-valve 43 with relation to the air-valve, the connection being by way of a rod 53 from piston 50 to a floating lever 54 and from thence by a rod 55 passing through a pressure-tight guide into the anterior pressure-chamber 10 to engage the short arm of a bell-crank lever 56 which connects by a rod 57 with the upper end of the link 44. Any increase in pressure and density of the burned gases, which follow the anterior air-pressure through a constant reduction as already stated, serves to depress the piston 50 and throw the pin 45 away from fulcrum 47, thus increasing the water-flow per unit of movement of the air-valve, and maintaining a constant or other desired ratio of quantity between the water, air and fuel. With constant quantity-ratios of air, fuel, and water thus maintained, the temperature of the quenched gases passing out through pipe 49 will tend to remain constant. Should any accidental variation of temperature occur through faulty adjustment, wear or similar causes, it may be corrected thermostatically, and for this purpose I have shown a thermostat 58 made of a suitable metal and connected by a rod 59 with the short end of the floating lever 54 so that it may act independently of the piston 50 to shift the pin 45, giving an increased water-flow when the temperature rises and a decreased flow when the temperature falls. This thermostat may be put out of action when desired by unhooking the upper end of rod 59 from the end of lever 54 and substituting a rigidly-supported rod 60 which affords a fixed fulcrum for the left-hand end of the lever. The lever 54 constitutes an "equalizer" or compensator between the piston 50 and thermostat 54, permitting their separate or conjoint action.

Although I have shown separate pressure-responsive pistons 30 and 50 for the fuel and water valves respectively, it will be understood that their functions may be combined, since both pistons are subject to the same pressure changes, and for this purpose I have shown a rod 61 adapted to be substituted for the rod 32 by unhooking the latter from the lever 33 and attaching the end of rod 61 so as to connect the link 44 with lever 33, in which case piston 50 will operate both links 44 and 26. When this is done the floating lever 54 should be given a fixed fulcrum on the rod 60 since otherwise if the temperature should rise, thermostat 58 would tend to increase the quantity of fuel and produce a further temperature increase.

It will be understood that suitable means may be provided for affording access to the hooked members 59, 60, 61, 32, or adjusting them, from the outside. An illustration of such means is not considered essential to an understanding of the functions of the elements themselves.

Fig. 2 shows my invention applied to the fuel and water feed of a steam-boiler heated by external combustion. The combustion-tube 18 discharges into the atmosphere and the flame and hot gases therein impinge on a water-vaporizing coil 62 fed from the duct 37 through jacket 42. A superheating coil 63 is shown in the lower part of the combustion-chamber and the steam discharges into chamber 48 on its way past the thermostat 58 and pressure-piston 50 to the engine-pipe 49. In this case the water-reservoir 38 is inclosed and separated from the initial air-chamber 10, and steam pressure is carried to the surface of the water in said reservoir through a pipe 64 so that the water-flow is made independent of any feed-varying influences excepting the orifice variation effected by valve 43. The water-feed will therefore be proportionate to the fuel-feed and the air-flow, which may be governed by devices similar to those described in Fig. 1. Air is fed to the anterior-pressure chamber 10 under a pressure above the atmospheric.

In both the internal-combustion and the external-combustion embodiments of my invention it will be observed that I have shown a water-vaporizer consisting of suitable chambers and passages for subjecting the water to the flame and hot gases. In Fig. 2 the heating is done entirely through walls, while in Fig. 1 it occurs partly through walls and partly by direct contact of the gases and water.

Figs. 3 and 4 show my invention embodied with a gas metering regulator of modified form. The septum and gas-valve are here merged in one valve-and-septum member in the form of a piston 65 whose rise and fall uncover and cover a greater or less number of perforations 66 in the wall of a cylinder 67 which contains the anterior-pressure gas-chamber 10. In this as in the previously-described form, the motor areas of the septum member have fixed values, unvaried by the opening and closing movements imposed thereby. The piston 65 is provided with a weight 68 co-acting with the weight of the parts to supply the constant valve-closing pressure which supplements the posterior gas pressure existing in the outer casing 69. The motion of the piston is communicated through a cylindrical rack 70 and a pinion 71 to the screw-threaded stem of a liquid orifice-varying valve 72 at the entrance of a liquid conduit 73 which opens into the eduction gas-pipe 49. The liquid and gas are mixed at the entrance to this pipe 49, which leads to an engine or other point of use. 74 is a liquid-reservoir connecting by pipe 75 with the casing of valve 72, and 76, 77 are a float and valve for maintaining a constant head of liquid. The anterior gas pressure is carried to the surface of the liquid in reservoir 74 through a pipe 78. Correction for variations in gas pressure is effected by rotating the piston 65 and causing legs 79 with which its lower edge is provided, to blank a greater or less number of vertical rows of the apertures 66. This gives a changed vertical position to the piston 67 for any given volume-flow of gas through the apertures 66, that is, for an increased gas density the piston travel will be greater per unit volume, and vice versa. Thus instead of changing the ratio of movement of the air and liquid valves as in Fig. 1 I maintain the same ratio between them but vary the ratio of both with relation to unit volume of gas-flow by varying the configuration of the total gas-passage through the apertures 66. Rotation of the piston 65 is effected by a pressure-responsive piston 80 similar to the pistons 30 and 50 in Fig. 1 which connects through a rack 81 and pinion 82 with a vertical squared rod 83 engaging a squared socket 84 in the stem of piston 65. In this modified form of the invention I have shown provision for controlling only one liquid, which may be fuel in a carbureter, or water in a hot-gas mixer connected with the discharge of an internal-combustion burner or engine, but obviously a plurality of liquids may be controlled as in Fig. 1.

It is obvious that, without departing from my invention in a broad sense, the adjustment effected by shifting the link-pins 29 and 45 in Fig. 1, rotating the piston 65 in Fig. 3, or similarly acting on any equivalent form of adjusting device, may be performed or controlled by some other force than the changing gaseous pressure, and in a manner automatic or otherwise as may be most suitable to the conditions of use.

The device shown in Fig. 1 may be converted into a carbureter for explosive engines by omitting or disabling the water-valve 43 and its associated members, or these may be retained in action for feeding fuel through the channel 37 past valve 43 as well as through the channel 20 past valve 25, the passages and valve-movements in any case being suitably calculated for the purpose to be accomplished. Under such circumstances of course the igniter 19 would not be used and the pressure-responsive pistons 30 and 50 would become inactive unless their outer chambers were sealed so as to contain a pressure substantially constant as compared with fluctuations in the atmospheric pressure. These piston devices or suitably sensitive equivalents would in the latter case act as barometers tending to correct the action of the carbureter for differences of topographical elevation, etc. For an explosive engine the two liquids might be fuel and water, the water being sprayed in small proportionate quantities into the charge in order to flatten the compression temperature curve for the engine toward the isothermal. When the apparatus is used as a suction carbureter, atmospheric air instead of compressed air is admitted to chamber 10, and the engine suction is communicated to chamber 17 from chamber 18 in the air-and-mixture passage, through the channel 16.

I am aware that my invention does not take account of the initial temperature of the entering air or other gas although capable of being so modified or added to as to accomplish this, but since the percentage variations of atmospheric temperature from the theoretical "absolute zero", are not large under actual conditions, the quantity-proportioning of air and liquid effected by the means here disclosed is so nearly uniform as to answer for practical purposes, and the results I believe to be more accurate and satisfactory than those heretofore attained.

I claim,—

1. A gas and liquid mixer comprising a mixing chamber having a gas inlet and a posterior liquid inlet, a valve-and-septum device having opposite surfaces of substantially fixed area exposed respectively to the mixing-chamber pressure and the gas-pressure anterior to the gas inlet, said device being subject to a substantially constant force tending to close the gas inlet and adapted to maintain a substantially-constant difference between the anterior and mixing-chamber pressures, and a liquid-controlling valve operated by said valve-and-septum device and adapted to graduate the liquid inlet in a predetermined relation to the variation of the gas inlet.

2. A gas and liquid mixer comprising a mixing chamber having gas and liquid inlets, a valve-and-septum device having opposite surfaces of substantially-fixed area exposed respectively to the mixing-chamber pressure and the gas-pressure anterior to the gas inlet, said device being subject to a substantially-constant force tending to close the gas-inlet, a fuel reservoir communicating with the fuel inlet and subject to said anterior pressure, a constant-level device for said reservoir, a valve controlling the fuel-inlet, and a motion-reducing connection from the valve-and-septum device to said fuel valve for imparting a movement to the latter in a predetermined ratio to that of the former.

3. A gas and liquid mixer comprising a mixing chamber having gas and liquid inlets adapted for a continuous flow, a reservoir for supplying said liquid inlet, said reservoir being subject to the gas pressure anterior to the gas inlet and having a constant-level device, a valve controlling the liquid inlet, means responsive to the volume of flow through the gas inlet for holding said valve at an opening corresponding to said volume, and adjusting means for varying the position of said valve relative to a given rate of gas flow.

4. A gas and liquid mixer comprising a mixing chamber having gas and liquid inlets, a valve-and-septum device controlling the gas inlet and responsive to the volume of flow therethrough, a reservoir for supplying said liquid inlet, said reservoir being subject to the gas pressure anterior to the gas inlet and having a constant-level device, a valve controlling the liquid inlet, a motion-reducing connection from the valve-and-septum device to the liquid-inlet valve, and means for adjusting said connection to vary the relative travel of said device and said liquid-inlet valve.

5. In a gas and liquid proportioning apparatus, the combination of connected devices for automatically measuring a gas flow and a liquid flow, and means responsive to the degree of pressure of said gas flow for varying the relation of said devices to maintain a known quantity ratio between the gas and liquid flows during variations in gas density.

6. In a gas and liquid proportioning apparatus, the combination of gas and liquid orifice-varying valves, a connection between said valves adjustable to vary the ratio of their movements, and means responsive to the degree of pressure in the flow through the gas orifice for automatically adjusting said connection.

7. In a carbureter, the combination of a mixing-chamber having inlet orifices, air and liquid-fuel measuring devices controlling said orifices and connected for orifice-varying movements in the ratio corresponding to the combustible ratio of the fluids, and means controlled by the pressure of the air-flow through said apparatus for varying the relative movement of said devices to correct for a variation in the density of said air-flow.

8. In a gas and liquid proportioning device, the combination of a gas-volume meter, a plurality of independent passages for different liquids, and a plurality of valves controlled by said gas-volume meter for maintaining the liquid flows in said passages in a known relation to the gas flow.

9. In a gas and liquid proportioning device, the combination of a gas chamber having a plurality of liquid inlets, a plurality of sources of liquid supply connected with the respective inlets, a gas-valve and a plurality of liquid valves controlling the gas and liquid currents, connections between said valves for maintaining the liquid orifices in constant ratios with the gas orifice, and means for operating said valves by the differential gas pressure established by the gas valve.

10. In a gas and liquid mixer, the combination of a mixing conduit having a gas inlet and a plurality of liquid inlets, valves controlling said liquid inlets, reservoirs subject to the gas pressure anterior to the gas inlet for supplying the liquid inlets, means for automatically maintaining the liquids in said reservoirs at a substantially constant level, and a valve device controlling the gas inlet and responsive to the volume of flow therethrough for operating said liquid-controlling valves.

11. In an air and liquid proportioning device, the combination of a combustion-chamber having air and liquid-fuel inlets, means for heating water by the combustion of the air and fuel, fuel and water feed-valves, means responsive to the volume of air-flow for actuating said valves, and a connection between said valves for coördinating their movements.

12. In an air and liquid proportioning device, the combination of a burner having air and liquid-fuel inlets, a water-vaporizer heated by said burner, air, liquid-fuel and water valves controlling the orifices for the respective fluids, means whereby the air-valve opening is varied automatically according to the volume of air flow, and connections between said valves for imparting orifice-varying movements to the liquid valves in constant ratios to the movements of the air valve.

13. In a gas and liquid proportioning device, the combination of a combustion-chamber, a gas-volume-measuring device appurtenant thereto, a liquid-orifice-varying valve actuated by said device, means responsive to the gas-pressure for varying the relative movement of said valve, and means responsive to the temperature of the fluid issuing from the combustion-chamber for independently varying said relative movement.

14. In a gas and liquid proportioning device, the combination of a burner, a water-vaporizer heated thereby, a water feed-valve for said vaporizer, devices responsive to steam pressure and temperature having a common control over said feed-valve, and a connection between said devices for permitting them to act independently of each other.

15. A gas and liquid mixer comprising a mixing chamber having a gas inlet, a gas valve controlling said inlet and combined with a septum operated by the difference in pressures established by the valve, a liquid inlet to said chamber posterior to the valve, a liquid valve controlling said inlet and operated by the septum, and means for establishing a fixed head of liquid above said liquid inlet.

16. A carbureter for combustion engines comprising a casing having a passage for the flow of air or other fluid, a fuel-supply channel communicating therewith, a valve controlling said channel, a suction-chamber having a channel communicating with said passage, and a diaphragm connected to said valve and separating said passage and said suction-chamber.

In testimony whereof I have hereunto set my hand in the presence of two subscribing witnesses, the 4th day of January 1907.

EDWARD P. NOYES.

Witnesses:
ARTHUR H. BROWN,
C. BATCHELDER.